United States Patent
Suzuki (12)

(10) Patent No.: US 11,605,513 B2
(45) Date of Patent: Mar. 14, 2023

(54) INFORMATION INPUT DEVICE AND IMAGE CAPTURE DEVICE

(71) Applicant: CANON KABUSHIKI KAISHA, Tokyo (JP)

(72) Inventor: Yuto Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 17/153,652

(22) Filed: Jan. 20, 2021

(65) Prior Publication Data

US 2021/0249206 A1    Aug. 12, 2021

(30) Foreign Application Priority Data

Feb. 7, 2020    (JP) .............................. JP2020-019728

(51) Int. Cl.
*H01H 25/04* (2006.01)
*G03B 17/02* (2021.01)

(52) U.S. Cl.
CPC ............. *H01H 25/04* (2013.01); *G03B 17/02* (2013.01)

(58) Field of Classification Search
CPC ...... H01H 19/14; H01H 19/11; H01H 19/585; H01H 19/58; H01H 19/62; H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01; H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26

See application file for complete search history.

(56) References Cited

U.S. PATENT DOCUMENTS

| 6,552,713 B1 | 4/2003 | Van Brocklin et al. |
| 2017/0213670 A1 * | 7/2017 | Okano .................... G05G 25/04 |

FOREIGN PATENT DOCUMENTS

| JP | H11345076 A | 12/1999 |
| JP | 4374049 B2 | 12/2009 |
| JP | 2013251160 A | 12/2013 |
| JP | 2017091613 A | 5/2017 |

* cited by examiner

*Primary Examiner* — Ahmed M Saeed
(74) *Attorney, Agent, or Firm* — Canon U.S.A., Inc. I.P. Division (57) ABSTRACT

Provided is an information input device that allows two types of operation, namely, rotation operation and tilt operation, and that can be downsized. In a case where the rotation operation component is seen in a direction orthogonal to a rotation axis direction of the rotation operation component, the rotation operation component has a first slope that faces a tilt operation component and that is on an inner periphery side of an annular shape of the rotation operation component and is inclined relative to the rotation axis of the rotation operation component. In the case where the rotation operation component is seen in the direction orthogonal to the rotation axis direction of the rotation operation component, a distance of the first slope from the rotation axis of the rotation operation component increases as a distance of the first slop from the rotation detection unit increases.

8 Claims, 8 Drawing Sheets

INFORMATION INPUT DEVICE AND IMAGE CAPTURE DEVICE

BACKGROUND

Field of the Disclosure

The present disclosure generally relates to an input device that is provided in an image capture device, such as a camera or a camcorder, and that performs input of various kinds of information, and in particular, relates to an information input device that allows input in a plurality of directions by tilt operation.

Description of the Related Art

Various operation components are necessary for electronic devices, such as cameras and camcorders.

A rotation dial that allows rotation operation and a tilt switch that can be tilted in a plurality of directions are provided as, for example, operation components used to set various setting items at the time of capturing a still image or a moving image.

As a related technique, an information input device is discussed in Japanese Patent Application Laid-Open No. 2013-251160.

Figure 7:
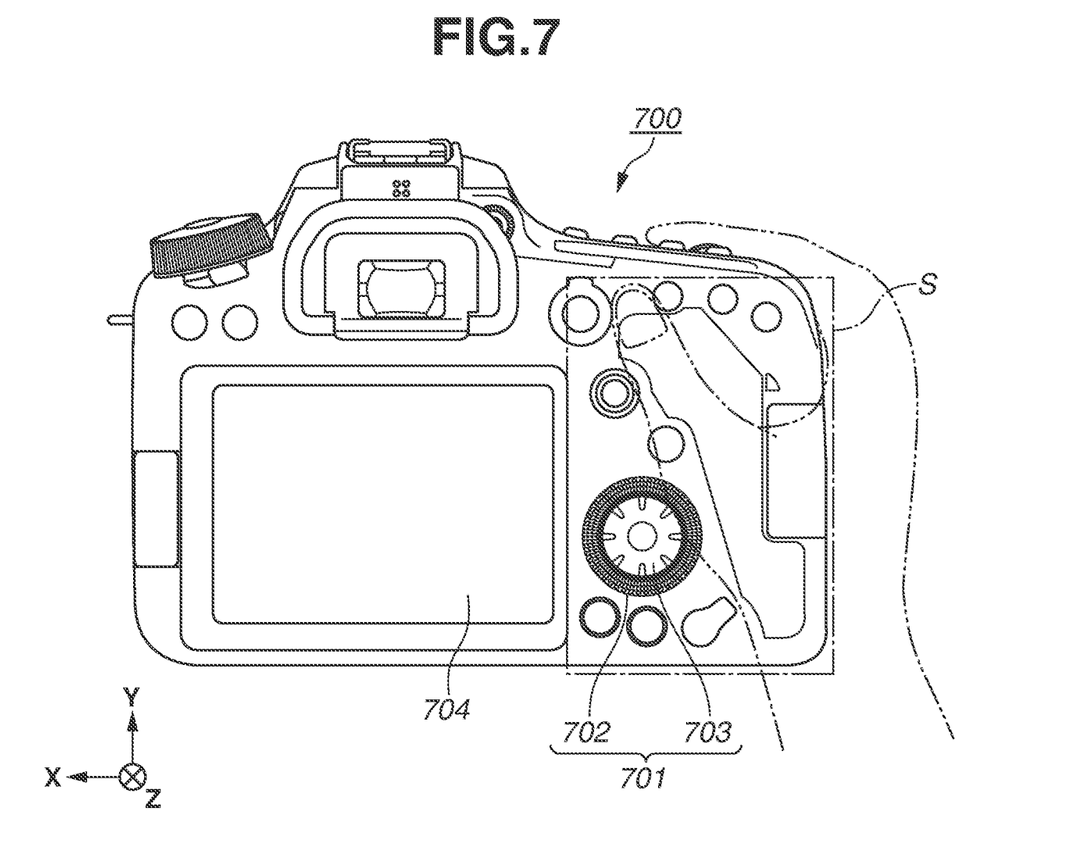
FIG. 7 is a diagram illustrating an external appearance of an electronic device equipped with an information input device in Japanese Patent Application Laid-Open No. 2013-251160.

FIG. 7 is a drawing illustrating an external appearance of an electronic device 700 equipped with an information input device 701 in Japanese Patent Application Laid-Open No. 2013-251160.

The information input device 701 includes two types of operation components, namely, a rotation operation component 702 and a tilt operation component 703.

In the information input device 701 of Japanese Patent Application Laid-Open No. 2013-251160, the rotation operation component 702 is annular, and the tilt operation component 703 is at the center of the rotation operation component 702. The tilt operation component 703 is circular and can be tilted to input information.

Consequently, the information input device 701, with which two types of information can be input, is placed on the electronic device 700 while securing a size that allows operation with the thumb of the right hand.

In recent years, the above-described electronic devices, such as cameras and camcorders, have been downsized. Operation components to be mounted on the electronic devices also need to be downsized while allowing two types of conventional operation, namely, rotation operation and tilt operation.

However, with the conventional technique discussed in Japanese Patent Application Laid-Open No. 2013-251160, it can be difficult to satisfy both a need for allowing two types of operation of the rotation operation and the tilt operation, and a need for downsizing. The reason will be described with reference to FIG. 7.

A display unit 704 includes a liquid crystal display (LCD), for example. On the display unit 704, various functions and parameters of the electronic device 700 are set, images are played back, and information is displayed.

Desirably, the display unit 704 is large to secure visibility of the display unit 704.

Thus, a range S that is indicated by a dashed-dotted line and in which various operation components are arranged needs to be reduced to downsize the electronic device 700, in particular, in an X direction. Accordingly, operation components used to set various functions and parameters for capturing images need to be downsized.

If the information input device 701 is downsized, an operation plane of the tilt operation component 703 becomes small. When a user tilts the tilt operation component 703, a finger of the user is likely to touch the rotation operation component 702.

If the finger of the user touches the rotation operation component 702, the tilt operation may be hindered. Thus, operability of the information input device 701 may decrease.

Therefore, it can be difficult to allow two types of operation, namely, the rotation operation and the tilt operation, and to perform downsizing with the configuration of the information input device 701 discussed in Japanese Patent Application Laid-Open No. 2013-251160.

SUMMARY

According to an aspect of the present disclosure, an information input device includes a rotation operation component being annular in shape and configured to allow rotation about a rotation axis extending in a direction perpendicular to a rotation operation plane of the rotation operation component, a tilt operation component configured to tilt in a plurality of directions within a plane orthogonal to the rotation axis of the rotation operation component, a tilt detection unit configured to detect a tilt operation by the tilt operation component, and a rotation detection unit configured to detect the rotation of the rotation operation component, wherein the tilt operation component extends in a rotation axis direction of the rotation operation component, wherein a tilt operation plane of the tilt operation component is coplanar with the rotation operation plane of the rotation operation component, wherein, in a case where the rotation operation component is seen in a direction orthogonal to the rotation axis direction of the rotation operation component, the rotation operation component has a first slope that faces the tilt operation component and that is on an inner periphery side of the rotation operation component and is inclined relative to the rotation axis of the rotation operation component, and wherein, in the case where the rotation operation component is seen in the direction orthogonal to the rotation axis direction of the rotation operation component, a distance of the first slope from the rotation axis of the rotation operation component increases as a distance of the first slope from the rotation detection unit increases.

According to exemplary embodiments of the present disclosure, an information input device that allows two types of operation of rotation operation and tilt operation and that can be downsized can be provided.

Further features of the present disclosure will become apparent from the following description of exemplary embodiments with reference to the attached drawings.

DESCRIPTION OF THE EMBODIMENTS

Exemplary embodiments of the present disclosure will be described in detail on the basis of the accompanying drawings.

The first exemplary embodiment of the present disclosure will be described with reference to FIGS. 1A to 3B.

Figure 1A:
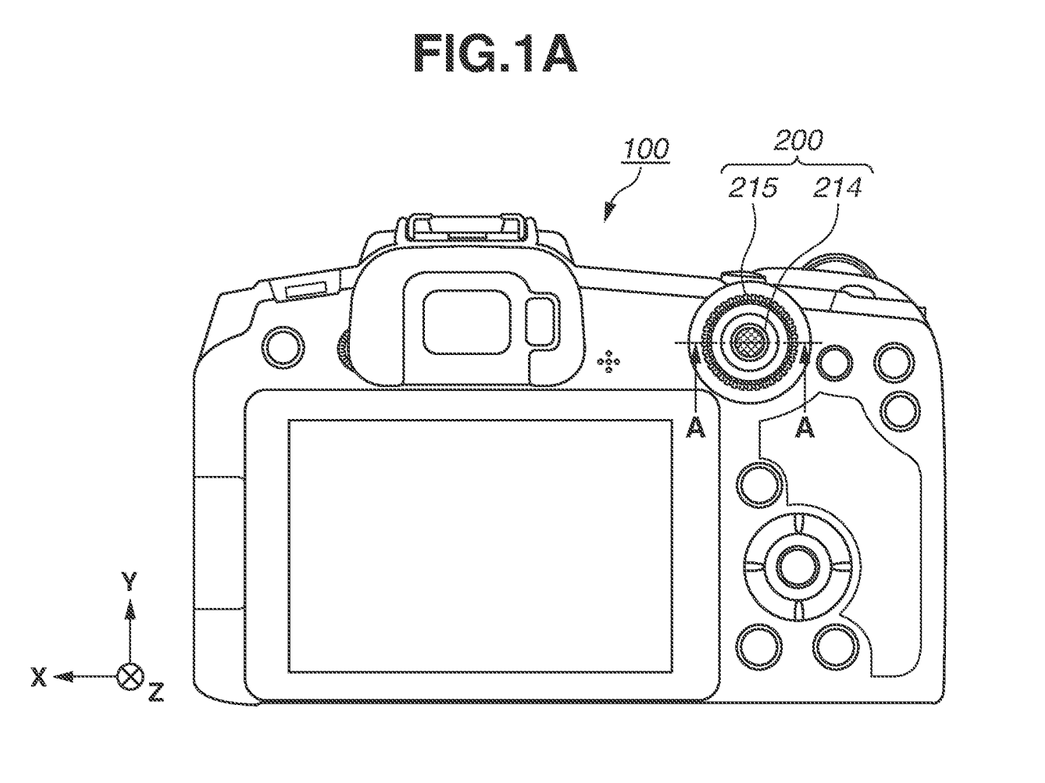
FIG. 1A is a diagram illustrating an external appearance of an electronic device equipped with an information input device according to a first exemplary embodiment.

FIG. 1A is a diagram illustrating the external appearance of an electronic device equipped with an information input device 200.

An example of the electronic device is a digital camera. Hereinafter, the electronic device will be referred to as a camera 100.

FIG. 1A is a rear view of the camera 100.

The information input device 200 according to the present exemplary embodiment includes a rotation operation system 215 and a tilt operation system 214.

The rotation operation system 215 and the tilt operation system 214 are used to set various functions and parameters of the camera 100.

Figure 1B:
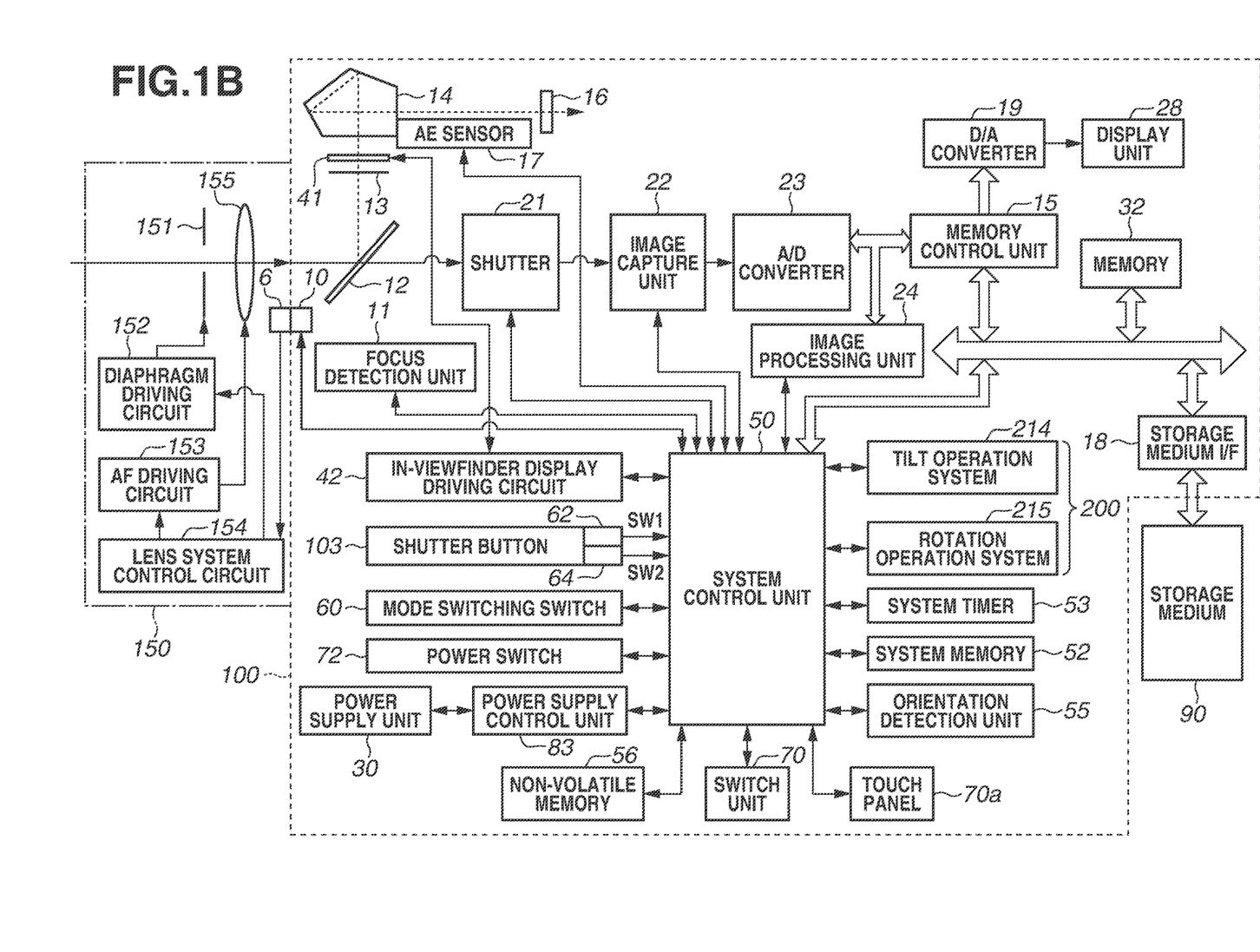
FIG. 1B is a block diagram illustrating a configuration of the electronic device equipped with the information input device according to the first exemplary embodiment.

FIG. 1B is a block diagram illustrating a configuration of the camera 100 and a lens unit 150.

The lens unit 150 is a lens unit on which an interchangeable imaging lens is to be mounted.

While one lens 155 is illustrated in FIG. 1B, a plurality of lenses 155 may be provided.

A communication terminal 6 is provided to allow the lens unit 150 to communicate with components on a camera 100 side.

A communication terminal 10 is provided to allow the camera 100 to communicate with components on a lens unit 150 side.

The lens unit 150 communicates with a system control unit 50 through the communication terminal 6 and the communication terminal 10.

A lens system control circuit 154 controls a diaphragm 151 through a diaphragm driving circuit 152. The lens system control circuit 154 changes a position of the lens 155 via an autofocus (AF) driving circuit 153 to adjust the focus.

Next, a configuration within the camera 100 will be described.

In FIG. 1B, a display unit 28 includes a back monitor that displays images and various settings of the camera 100.

The display unit 28 may be any display such as a liquid crystal display or an organic electroluminescent (EL) display.

A user operates the rotation operation system 215 and the tilt operation system 214 to switch between images displayed on the display unit 28 and to change various settings of the camera 100.

The display unit 28 is configured to be integral with a touch panel 70a that detects touch operation.

Various types of touch panels, such as a resistive touch panel, a capacitive touch panel, a surface acoustic wave touch panel, an infrared touch panel, an electromagnetic induction touch panel, an image recognition touch panel, and a photosensor touch panel, can be applied as the touch panel 70a.

Some types of touch panels detect a touch on the basis of a touch on the touch panel. Other types of touch panels detect a touch on the basis of a finger or a stylus pen approaching the touch panel. Any of these types of touch panels can be applied.

A viewfinder 16 is a viewfinder used to check a focus and composition of an optical image of an object obtained through the lens unit 150.

A user observes an image focused on a focusing screen 13 via a pentaprism 14 and the viewfinder 16 to check a focus state and composition of an optical image of an object obtained through the lens unit 150.

An electronic viewfinder (EVF) can be applied as the viewfinder 16. The EVF displays an image signal obtained by an image capture unit 22.

In this case, the focusing screen 13 and the pentaprism 14 can be eliminated.

An in-viewfinder display driving circuit 42 that drives an in-viewfinder display unit 41 within the viewfinder 16 is connected with the system control unit 50.

An auto exposure (AE) sensor 17 measures luminance of an object, an image of which is formed on the focusing screen 13 via the lens unit 150 and an instant-return mirror (mirror) 12.

A focus detection unit 11 is an autofocus sensor based on phase-difference detection. The focus detection unit 11 captures an image that enters via the mirror 12 and outputs information that indicates an amount of defocus to the system control unit 50.

Hereinafter, autofocus may be referred to as AF.

The system control unit 50 controls the lens unit 150 on the basis of the information that indicates an amount of defocus, to perform phase difference AF.

The method of AF is not limited to the phase difference AF and may be contrast AF, for example.

The phase difference AF may be performed without using the focus detection unit 11. Instead, the phase difference AF may be performed on the basis of an amount of defocus detected on an image sensing plane of the image capture unit 22 (image sensing plane phase difference AF).

The mirror 12 is moved up or down by an actuator (not illustrated) on the basis of an instruction from the system control unit 50 during, for example, an exposure, live view image capturing, and moving image capturing.

The mirror 12 is a mirror that switches between a viewfinder 16 side and an image capture unit 22 side to which a light beam that has entered from the lens 155 is guided.

The mirror 12 is usually placed to reflect a light beam to the viewfinder 16.

In a case where image capturing is performed or live view display is performed, the mirror 12 jumps up to avoid a light beam so that the light beam is guided to the image capture unit 22 (mirror up).

The mirror 12 has a central portion that is a half mirror through which part of a light beam passes. The part of the light beam transmits through the mirror 12 and enters the focus detection unit 11 that detects the focus.

Under control of the system control unit 50, a focal-plane shutter (shutter) 21 is used to control an exposure period of the image capture unit 22.

The image capture unit 22 is an image sensor that includes, for example, a charge-coupled device (CCD) sensor or a complementary-metal-oxide-semiconductor (CMOS) sensor that converts an optical image into an electrical signal.

An analog-to-digital (A/D) converter 23 converts an analog signal output from the image capture unit 22 into a digital signal.

An image processing unit 24 applies predetermined processing to data (digital signal data) output from the A/D converter 23 or data output from a memory control unit 15.

The predetermined processing includes, for example, pixel interpolation, resizing processing such as reduction, and color conversion processing.

The image processing unit 24 uses captured image data to perform predetermined computation processing.

The system control unit 50 performs, for example, exposure control and ranging control on the basis of a computation result.

Consequently, through-the-lens (TTL) AF processing, TTL AE processing, and TTL pre-flashing (EF) processing are performed.

The image processing unit 24 uses captured image data to perform predetermined computation processing.

TTL automatic white balance (AWB) processing is performed on the basis of a computation result obtained from the computation processing.

A memory 32 stores image data captured by the image capture unit 22 (digital data converted by the A/D converter 23), and image data to be displayed on the display unit 28.

The memory 32 has a storage capacity that is sufficient to store the predetermined number of still images and a predetermined length of moving images and audio data.

The memory 32 may be a detachable storage medium such as a memory card or may be a built-in memory.

A digital-to-analog (D/A) converter 19 converts a digital signal of image display data stored in the memory 32 into an analog signal, and outputs the analog signal to the display unit 28.

Consequently, an image is displayed on the display unit 28.

An orientation detection unit 55 is a sensor that detects an orientation of the camera 100 based on an angle of the camera 100.

A non-volatile memory 56 is a memory in which data can be recorded or from which the data can be erased electrically by the system control unit 50. An electrically erasable programmable read-only memory (EEPROM), for example, is applicable as the non-volatile memory 56.

The non-volatile memory 56 stores, for example, constants used for operations of the system control unit 50, and programs used to operate the camera 100.

The system control unit 50 includes at least one processor and controls the whole camera 100.

The processor of the system control unit 50 executes programs stored in the non-volatile memory 56 to perform various types of control of the camera 100.

Constants and variables used for operations of the system control unit 50, programs read from the non-volatile memory 56, and the like are loaded into system memory 52.

The system control unit 50 controls the memory 32, the D/A converter 19, the display unit 28, and the like to perform display control.

A system timer 53 is a timer that measures a time used for various types of control and measures a time of a built-in clock.

A mode switching switch 60 is a switch used to switch to any operation mode among a plurality of operation modes (for example, a still-image capturing mode and a moving image capturing mode) of the system control unit 50.

The still-image capturing mode includes a programmed AE mode (P mode) and a manual mode (M mode).

It is also possible to use a configuration that allows a user to display a menu screen using the mode switching switch 60 once and then to switch to one of the modes contained in the menu screen.

Similarly, a plurality of moving image capturing modes may be provided.

The M mode allows the user to set an aperture value, a shutter speed, and an International Organization for Standardization (ISO) sensitivity. Thus, a user performs image capturing using an exposure set by the user.

A shutter button 103 is an instruction unit used to issue an image capturing instruction.

A first shutter switch 62 is switched on by operating the shutter button 103 of the camera 100 halfway, i.e., by a half press of the shutter button 103 (image capturing preparation instruction), and generates a first shutter switch signal SW1.

If the first shutter switch signal SW1 is generated, operations such as AF processing, AE processing, automatic white balance (AWB) processing, and pre-flashing (EF) processing are started.

Further, an AE sensor 17 meters light.

A second shutter switch 64 is switched on by completing operation of the shutter button 103, i.e., by a full press of the shutter button 103 (image capturing instruction), and generates a second shutter switch signal SW2.

If the second shutter switch signal SW2 is generated, the system control unit 50 starts a series of operations of image capturing processing from reading a signal from the image capture unit 22 to writing image data to a storage medium 90.

A power switch 72 is an operation component used to switch a power supply of the camera 100 on and off.

A power supply control unit 83 includes, for example, a battery detection circuit, a direct current to direct current (DC-DC) converter, and a switch circuit that switches a block to be energized.

The power supply control unit 83 detects whether a battery is installed and detects, for example, the type of the battery and a remaining battery level.

The power supply control unit 83 controls the DC-DC converter on the basis of a detection result and an instruction from the system control unit 50 to supply a necessary voltage to each of the units including the storage medium 90 for a necessary period.

A power supply unit 30 includes, for example, a primary battery such as an alkaline battery or a lithium battery, a secondary battery such as a nickel-cadmium (Ni—Cd) battery, a nickel-metal hydride (NiMH) battery, or a lithium (Li) battery, or an alternating-current (AC) adapter.

A storage medium interface (I/F) 18 is an interface between the camera 100 and the storage medium 90 such as a memory card or a hard disk.

The storage medium 90 is a storage medium such as a memory card that stores captured images. The storage medium 90 includes, for example, a semiconductor memory or a magnetic disk.

Figure 2:
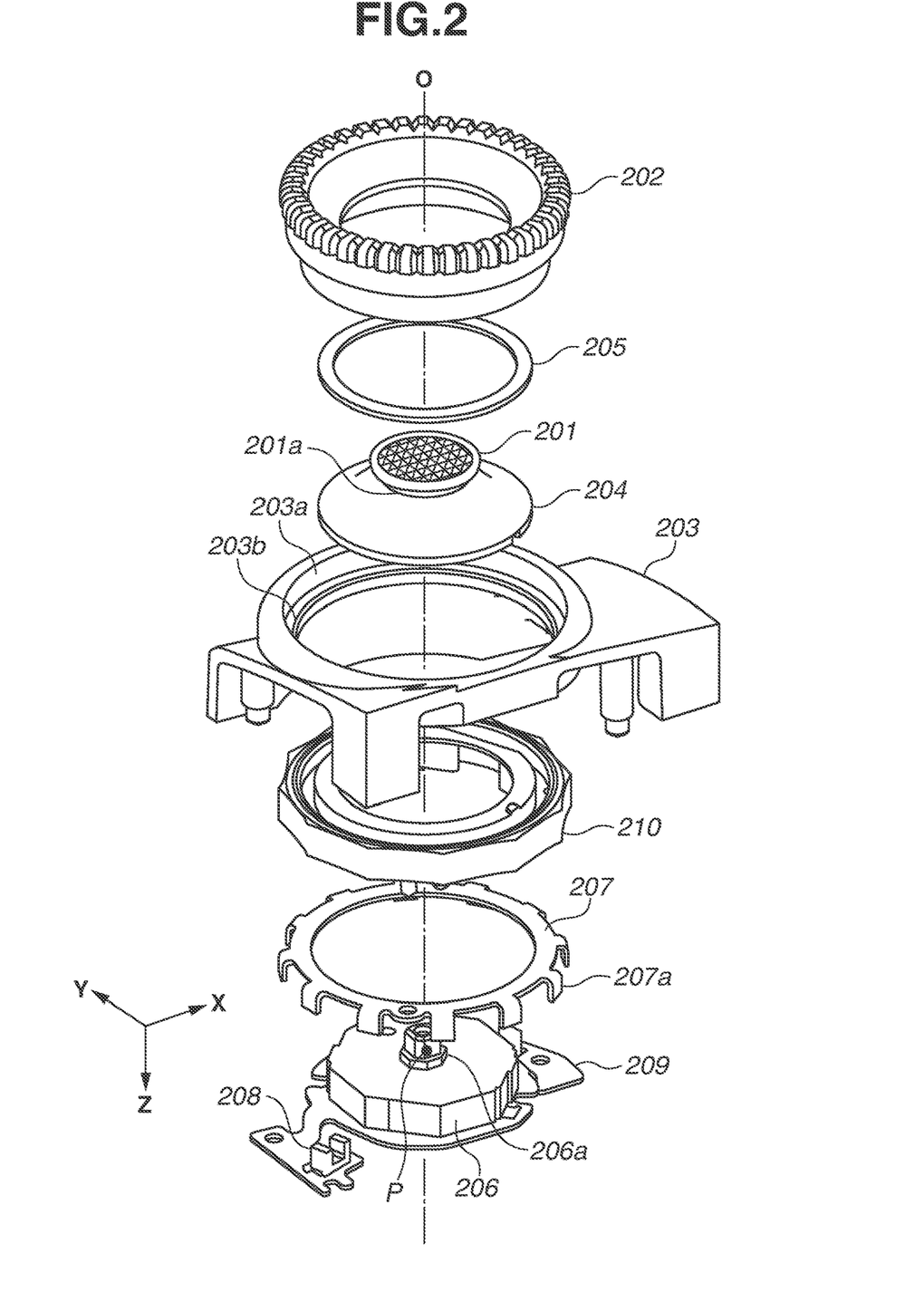
FIG. 2 is an exploded perspective view of the information input device according to the first exemplary embodiment.

FIG. 2 is an exploded perspective view of the information input device 200 according to the first exemplary embodiment of the present disclosure.

The rotation operation system 215 of the information input device 200 according to the present exemplary embodiment includes a rotation dial 202, a support component 210, a light shield plate 207, and a pair of photointerrupters 208 mounted on a printed wiring board 209.

The rotation dial 202 is annular and is a rotation operation component of the camera 100.

The support component 210 is a support component that rotatably supports the rotation dial 202.

The light shield plate 207 is fixed to a back side of the support component 210. The light shield plate 207 rotates integrally with the rotation dial 202 and the support component 210.

The printed wiring board 209 is placed below the rotation dial 202. The pair of photointerrupters 208 as transmissive photosensors and a movable switch 206 are mounted on the printed wiring board 209.

The light shield plate 207 includes light shield walls 207a. While the light shield plate 207 rotates, the light shield walls 207a shield or do not shield the photointerrupters 208 from light.

The light shield walls 207a pass inside the photointerrupters 208, so that each of the photointerrupters 208 switches between a state in which the photointerrupter 208 is shielded from light and a state in which the photointerrupter 208 is not shielded from light. Consequently, the photointerrupters 208 can detect rotation of the rotation dial 202.

As a method of detecting rotation of the rotation dial 202, a conventional technique discussed in Japanese Patent Application Laid-Open No. 2017-91613, for example, may be used. Thus, the method of detecting rotation of the rotation dial 202 will not be described in detail.

The tilt operation system 214 of the information input device 200 according to the present exemplary embodiment includes a key top 201, the movable switch (tilt detection unit) 206 attached to the printed wiring board 209, a splash-proof component 204, and a sliding component 205.

The key top 201 has a shape substantially like a shaft and extends in a direction of an axis O that is a rotation axis of the rotation dial 202. The camera 100 includes the key top 201 as an operation component that can tilt.

The key top 201 is provided inside the rotation dial 202 in such a manner that a tilt center P (details of the tilt center P will be described below) of the key top 201 coincides with the axis O that is the rotation axis of the rotation dial 202.

The key top 201 is fitted on a shaft 206a of the movable switch 206. The key top 201 can be tilted to input tilt operation in eight directions into the movable switch 206 mounted on the printed wiring board 209.

The splash-proof component 204 is fitted in and held by a recess 201a at part of an outer periphery of the key top 201.

If the key top 201 is moved, the key top 201 and the splash-proof component 204 are moved together and maintain the fitted state.

Since the splash-proof component 204 is held between the rotation dial 202 and the support component 210, the splash-proof component 204 seals the inside of the rotation dial 202 and does not allow water and dust to enter an inside of the information input device 200.

The sliding component 205 is attached to the rotation dial 202.

The sliding component 205 reduces friction when the rotation dial 202 rotates, and thus allows the rotation dial 202 to slide relative to the splash-proof component 204.

An exterior cover 203 is an exterior cover of the camera 100. In FIG. 2, a —Z direction is an outside of the camera 100.

A protrusion 203b of the exterior cover 203 is held between the support component 210 and the rotation dial 202. Consequently, the information input device 200 is supported in a hole 203a of the exterior cover 203.

Figure 3A:
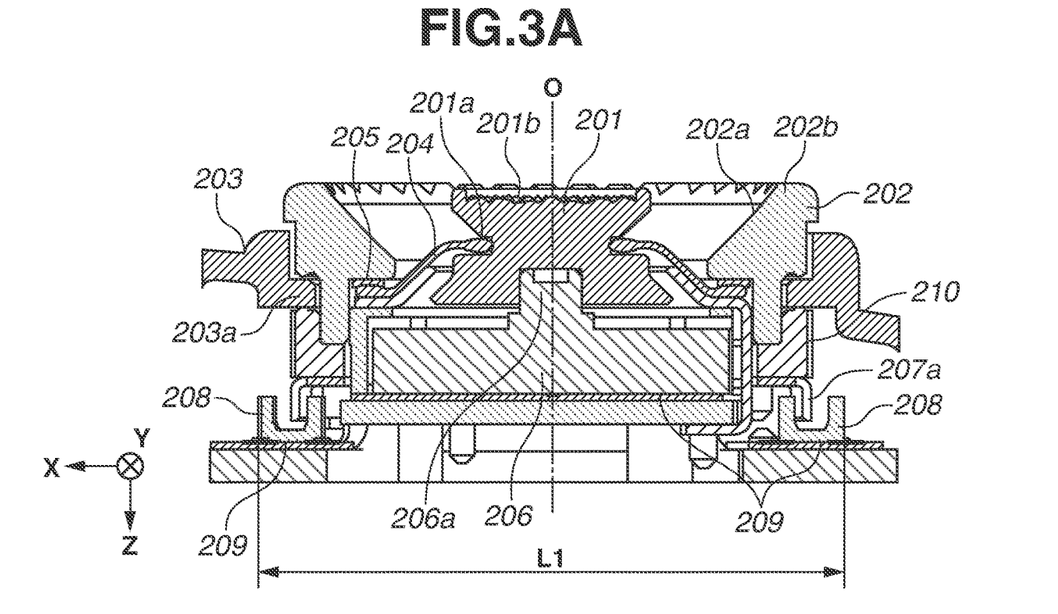
FIG. 3A is a cross-sectional view of the information input device according to the first exemplary embodiment.
Figure 3B:
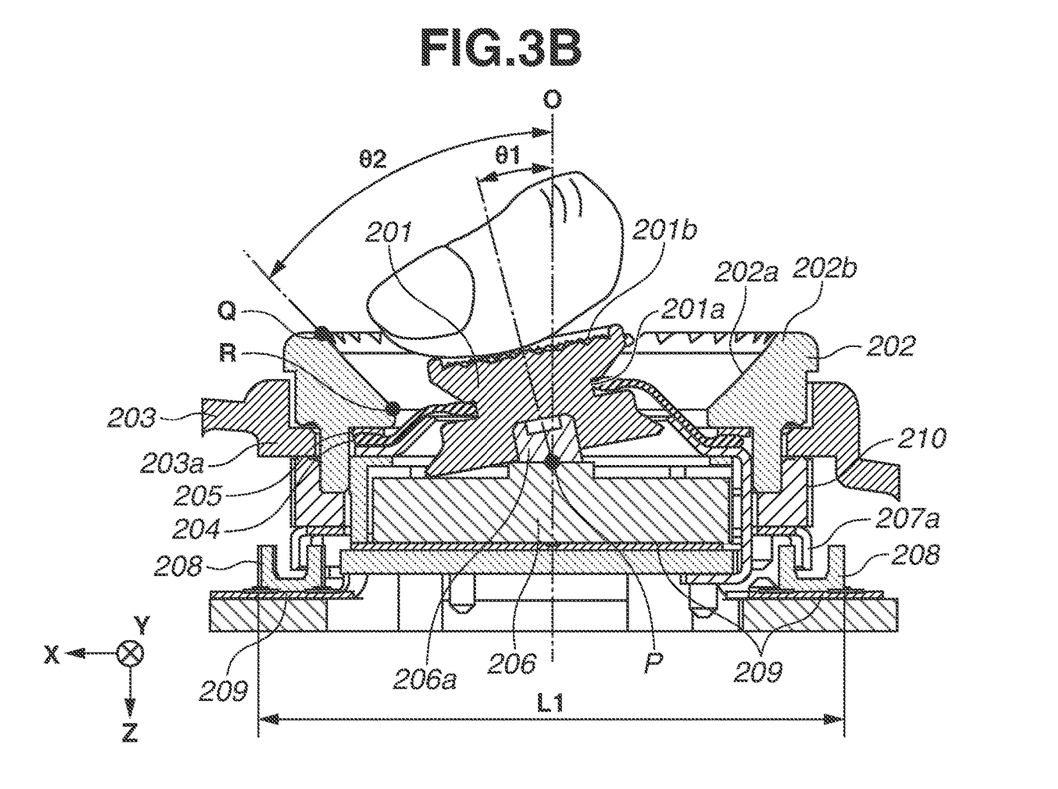
FIG. 3B is a cross-sectional view of the information input device that is tilted according to the first exemplary embodiment.

FIGS. 3A and 3B are cross-sectional views of the information input device 200 according to the first exemplary embodiment of the present disclosure. FIGS. 3A and 3B are cross-sectional views taken along line A-A in FIG. 1A.

FIG. 3A illustrates a state in which the key top 201 does not tilt. FIG. 3B illustrates a state in which the key top 201 tilts in an arbitrary direction.

In FIG. 3B, the key top 201 is tilted at a maximum tilt angle θ1 within a range in which the movable switch 206 can tilt.

To secure operability of both rotation operation and tilt operation, in the present exemplary embodiment, a rotation operation plane 202b of the rotation dial 202 and a tilt operation plane 201b of the key top 201 are placed on substantially the same plane.

The reason is as follows.

First, in a case where the rotation operation plane 202b is higher than the tilt operation plane 201b in the —Z direction, a finger of a user is likely to touch the key top 201 while the rotation dial 202 is rotated around.

Consequently, wrong operation that unintentionally inputs the tilt operation during the rotation operation is more likely to occur. Thus, operability of the information input device 200 decreases.

Alternatively, in a case where the rotation operation plane 202b is lower than the tilt operation plane 201b in the —Z direction, the user needs to insert a finger in the rotation dial 202 during the tilt operation. Thus, the finger of the user is likely to touch the rotation dial 202.

Consequently, wrong operation that unintentionally inputs the rotation operation during the tilt operation is more likely to occur. Thus, operability of the information input device 200 decreases.

To prevent such wrong operation, preferably, the rotation operation plane 202b and the tilt operation plane 201b are at the same height in a Z direction.

Due to the above reason, in the present exemplary embodiment, the rotation operation plane 202b and the tilt operation plane 201b are placed on substantially the same plane.

Consequently, such unintentional tilt operation and rotation operation as described above are prevented.

As illustrated in FIGS. 3A and 3B, the rotation dial 202 includes a first slope 202a at an inclination of θ2 that connects a point Q and a point R on an inner periphery of the rotation dial 202.

The point Q is placed apart from an external form of the key top 201.

Consequently, when the user tilts the key top 201, the key top 201 is less likely to touch the rotation dial 202, or a finger of the user who operates the key top 201 is less likely to touch the rotation dial 202.

In other words, the tilt operation of the key top 201 is less likely to be hindered.

On the other hand, the point R is placed near the external form of the key top 201.

A range in which the key top 201 can tilt is small at the point R since the point R is near the tilt center P. Further, since the point R is lower than the tilt operation plane 201b in the Z direction, a finger of the user does not touch the point R.

Thus, the point R can be placed near the external form of the key top 201, and thus an inner diameter of the rotation dial 202 can be decreased.

Consequently, the rotation dial 202 is less likely to interfere with the range in which the key top 201 can tilt. Further, the rotation dial 202 can be downsized in a radial direction (X direction).

The information input device 200 includes the rotation detection units (photointerrupters) 208. The rotation detection units 208 detect the rotation operation of the rotation operation component (rotation dial) 202 about the rotation axis of the rotation operation component 202.

The tilt operation component (key top) 201 is supported on the tilt detection unit (movable switch) 206. The tilt detection unit 206 can detect the tilt operation relative to the rotation axis of the rotation operation component 202.

The tilt operation component 201 applies tilt input actions in a plurality of directions within a plane orthogonal to the rotation axis. The tilt operation component 201 is formed to extend in a rotation axis direction of the rotation operation component 202 that is annular and allows the rotation operation.

The tilt operation plane 201b of the tilt operation component 201 is placed within an annular shape of the rotation operation plane 202b of the rotation operation component 202.

The rotation operation component 202 has the first slope 202a. The first slope 202a faces the tilt operation component 201 in a case where the rotation operation component 202 is seen in a direction orthogonal to the rotation axis of the rotation operation component 202. The first slope 202a is on an inner periphery side of an annular shape of the rotation operation component 202. The first slope 202a is inclined relative to the rotation axis of the rotation operation component 202.

In the case where the rotation operation component 202 is seen in a direction orthogonal to the rotation axis of the rotation operation component 202, the first slope 202a becomes away from the rotation axis of the rotation operation component 202 as the first slope 202a becomes away from the rotation detection units 208 in the rotation axis direction.

With the above configuration, the information input device 200 according to the present exemplary embodiment allows two types of operation, namely, the rotation operation and the tilt operation. Further, with the above configuration, the information input device 200 can be downsized.

Hereinafter, a configuration that allows an information input device 200 to be further downsized relative to the configuration according to the first exemplary embodiment will be described with reference to FIG. 4.

Figure 4:
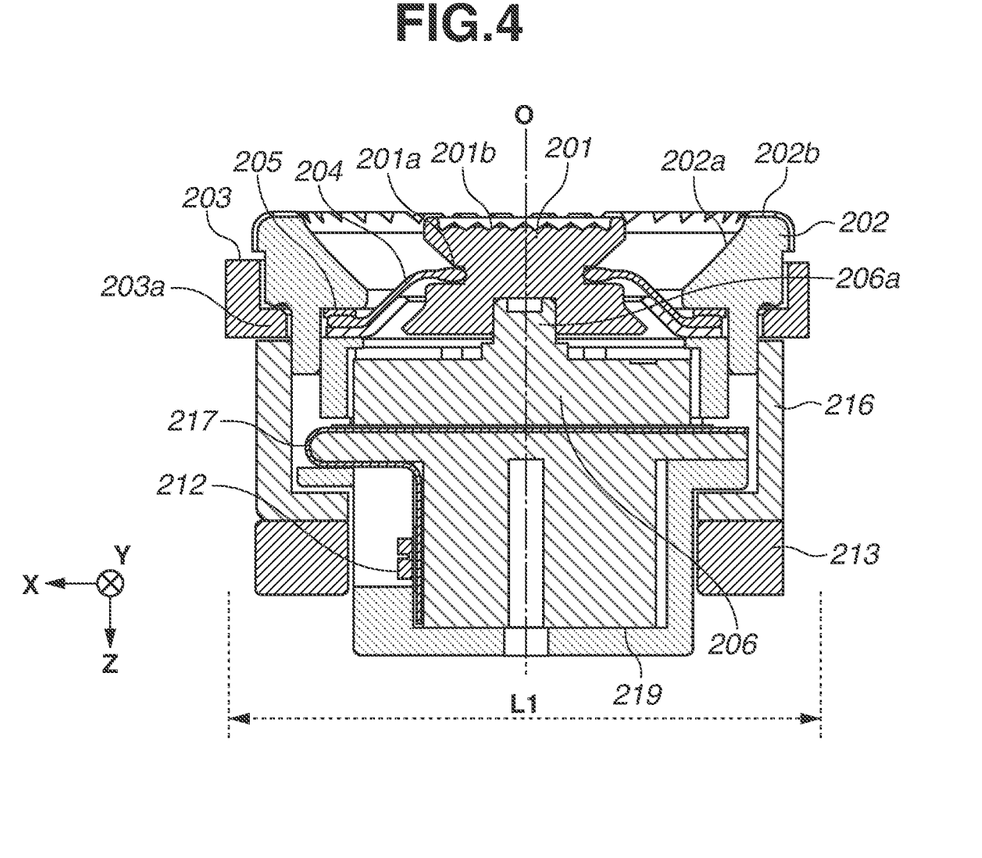
FIG. 4 is a cross-sectional view of an information input device according to a second exemplary embodiment.

FIG. 4 is a cross-sectional view of an information input device 200 according to a second exemplary embodiment of the present disclosure.

Parts that are the same as parts of the information input device 200 described in the first exemplary embodiment are indicated with the same reference numerals and will not be described in the present exemplary embodiment.

With reference to FIGS. 3A and 3B, the photointerrupters 208 are placed on a most outer side of the configuration of the information input device 200 according to the first exemplary embodiment.

A size of the information input device 200 according to the first exemplary embodiment depends on layout of the photointerrupters 208. The size of the information input device 200 according to the first exemplary embodiment is represented by a line segment L1 illustrated in FIGS. 3A and 3B.

Thus, the information input device 200 can be downsized by placing the photointerrupters 208 illustrated in FIGS. 3A and 3B further inside the rotation dial 202 in a radial direction (X direction) of the rotation dial 202.

In the information input device 200 according to the present exemplary embodiment, photointerrupters 208 are placed under the movable switch 206 and further inside in a radial direction (X direction) of the rotation dial 202 relative to an external form of the movable switch 206.

As illustrated in FIG. 4, in the information input device 200 according to the present exemplary embodiment, photoreflectors 212 are used instead of the photointerrupters 208 as units that detect rotation of the rotation dial 202.

In a case where the photointerrupters 208 are used, a direction in which the light shield plate 207 is inserted into the photointerrupters 208 (X direction) is orthogonal to the Z direction in which the information input device 200 is assembled.

Consequently, it is difficult to assemble the information input device 200 from one direction.

A rotation operation system 218 of the information input device 200 according to the present exemplary embodiment includes the rotation dial 202, a support component 216, a reflection component 213, the pair of photoreflectors 212 attached to a printed wiring board 217, and a seat 219 as a holding unit.

In FIG. 4, one pair of photoreflectors 212 is attached to the printed wiring board 217 to detect a rotational direction. However, the other pair of photoreflectors 212 is not illustrated in FIG. 4.

The photoreflectors 212 are bonded and fixed to the printed wiring board 217 on the seat 219 in such a manner that directions of emission from the photoreflectors 212 are orthogonal to an axis O.

In the present exemplary embodiment, the photoreflectors 212 are placed in such a manner that the directions of emission are orthogonal to the axis O. However, the photoreflectors 212 may be placed in such a manner that the directions of emission are parallel to the axis O.

The reflection component 213 has a detection pattern (not illustrated) on a plane facing the photoreflectors 212. The detection pattern is made of white and black alternately painted on the plane in a circumferential direction.

The reflection component 213 is fixed to a back side of the support component 216. The reflection component 213 rotates together with the rotation dial 202 and the support component 216.

When the rotation dial 202 rotates, the detection pattern (not illustrated) facing the photoreflectors 212 alternately switches between white and block.

The switch of the detection pattern (not illustrated) is detected by the pair of photoreflectors 212 to detect rotation of the rotation dial 202.

The rotation operation system 218 includes the holding component (seat) 219 used to place the rotation detection units (photoreflectors) 212 inside the information input device 200, and the reflection unit (reflection component) 213 that has a reflection plane on which emitted light emitted from the rotation detection units 208 is reflected.

The rotation detection units 212 are reflection-type photosensors. In a case where the rotation detection units 212 are seen in a direction orthogonal to the rotation axis of the rotation operation component 202, the rotation detection units 212 are placed further inside the rotation operation component 202 in the radial direction of the rotation operation component 202 relative to the external form of the tilt detection unit 206.

The rotation detection units 212 are placed on the holding component 219 in such a manner that a detection direction of each of the rotation detection units 212 is orthogonal to the rotation axis of the rotation operation component 202.

The reflection unit 213 is placed in such a manner that a reflection plane of the reflection unit 213 faces the rotation detection units 212.

The above configuration allows the information input device 200 according to the present exemplary embodiment to be downsized relative to the configuration according to the first exemplary embodiment.

Hereinafter, a dust prevention configuration suitable for an information input device 200 will be described relative to the configuration according to the first exemplary embodiment with reference to FIGS. 5A and 5B.

With the configuration according to the first exemplary embodiment described in FIGS. 1A to 3B, the information input device 200 allows two types of operation, the rotation operation and the tilt operation. Further, with the above configuration, the information input device 200 can be downsized.

However, provision of the first slope 202a forms a mortar-like shape, and there is a concern that foreign objects such as dirt and dust are likely to be attracted from an outside of the information input device 200.

As a result, the dust and dirt may enter between the rotation dial 202 and the splash-proof component 204 or the sliding component 205. Consequently, operability of the rotation dial 202 may decrease, and operation failure of the rotation dial 202 may occur.

Figure 5A:
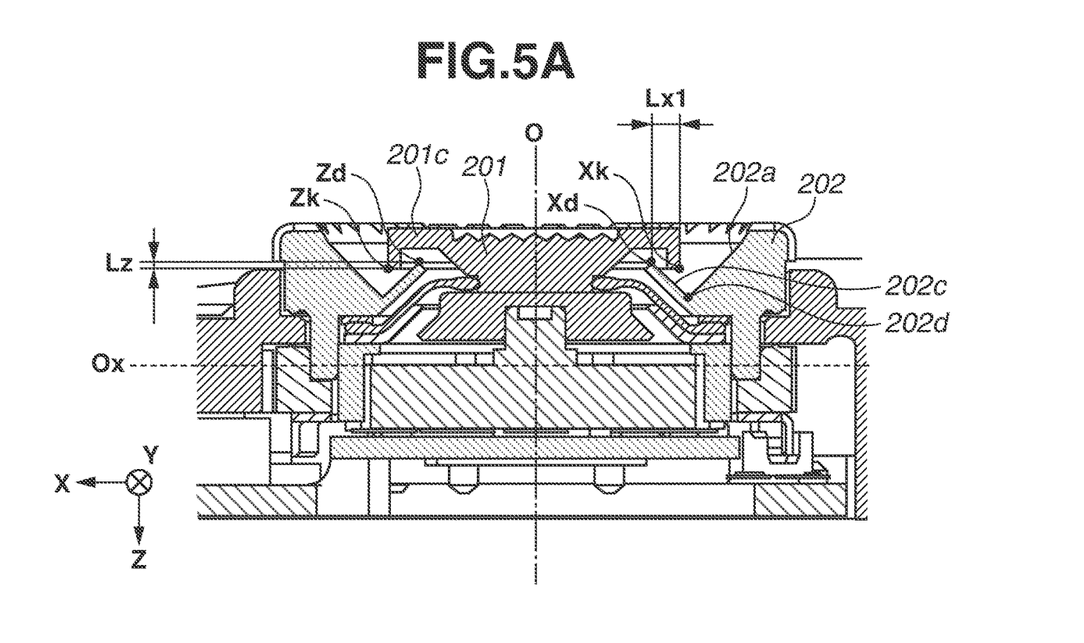
FIG. 5A is a cross-sectional view of an example of an operation component that has a dust prevention configuration (fitting configuration).

FIG. 5A is a cross-sectional view of an example of an operation component that has a dust prevention configuration (spigot configuration).

A key top 201 has a flange 201c. A rotation dial 202 has a second slope 202c. The second slope 202c forms a bent V shape (bent portion 202d) with a first slope 202a.

Consequently, even if dirt falls on the first slope 202a, the bent portion 202d within the rotation dial 202 can hold back the dirt.

An outer end Xk is an X-coordinate position of an outermost end of the key top 201 relative to an axis O. An inner end Xd is an X-coordinate position of an inner end of the rotation dial 202 relative to the axis O.

A lower end Zk is a Z-coordinate position of a lower end of the flange 201c of the key top 201 relative to a standard line Ox that is orthogonal to the axis O. An upper end Zd is a Z-coordinate position of an upper end of the second slope 202c of the rotation dial 202 relative to the standard line Ox.

The outer end Xk of the flange 201c of the key top 201 partially overlaps the inner end Xd of the second slope 202c in a radial direction (X direction) of (an overlap amount Lx1).

This prevents dirt and dust from being caught from the Z direction and prevents operability of the rotation dial 202 from decreasing or operation failure of the rotation dial 202 from occurring.

The upper end Zd of the second slope 202c partially overlaps the lower end Zk of the flange 201c of the key top 201 in the Z direction (an overlap amount Lz).

This prevents dirt and dust from being caught from the radial direction (X direction) and prevents operability of the rotation dial 202 from decreasing or operation failure of the rotation dial 202 from occurring.

Figure 5B:
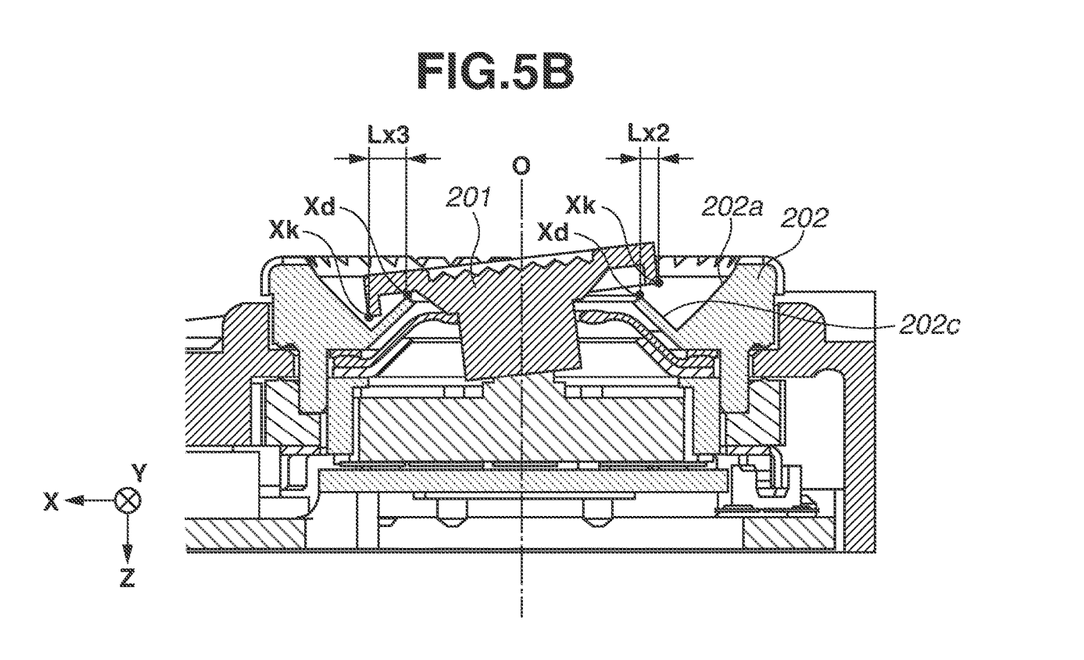
FIG. 5B is a cross-sectional view illustrating a key top in FIG. 5A that is tilted.

FIG. 5B is a cross-sectional view that illustrates the key top 201 in FIG. 5A that is tilted.

The flange 201c and the second slope 202c are formed in such a manner that Xk−ΔXk>Xd is satisfied, where ΔXk is an amount of change of the outer end Xk when a user tilts the key top 201.

In other words, a relationship in which the outer end Xk of the flange 201c of the key top 201 partially overlaps the inner end Xd of the second slope 202c in the radial direction (X direction) (overlap amounts Lx2 and Lx3) is maintained.

In the third exemplary embodiment, the flange 201c of the key top 201 does not touch the first slope 202a to prevent the key top 201 from touching and scratching the first slope 202a of the rotation dial 202.

A rotation operation component 202 has the second slope 202c at an end of the first slope 202a that is close to rotation detection units 208. In a case where the rotation operation component 202 is seen in a direction orthogonal to a rotation axis direction of the rotation operation component 202, the second slope 202c becomes closer to the rotation axis of the rotation operation component 202 as the second slope 202c becomes away from the rotation detection units 208 in a rotation axis direction.

In a case where the rotation operation component 202 is seen in the direction orthogonal to the rotation axis of the rotation operation component 202, an end of the second slope 202c that is on an inner side and is close to a tilt operation plane 201b is positioned closer to the rotation axis than an end of an outer edge in a radial direction of a tilt operation component 201 is.

Relative to the rotation axis direction, the end of the second slope 202c that is on the inner side and is close to the tilt operation plane 201b is lower than an end of the first slope 202a that is close to the tilt operation plane 201b, is lower than the tilt operation plane 201b of the tilt operation component 201, and is higher than an end of the tilt operation component 201 that is close to the rotation detection units 208.

In a case where the rotation operation component 202 is seen in the direction orthogonal to the rotation axis of the rotation operation component 202, the end of the second slope 202c that is on the inner side and is close to the tilt operation plane 201b is positioned closer to the rotation axis than an end of the outer edge in the radial direction of the tilt operation component 201 is in a state where the tilt operation component 201 is tilted.

With the above configuration, it is possible to prevent dirt and dust from being caught, and to prevent operability of the rotation dial 202 from decreasing or operation failure of the rotation dial 202 from occurring.

Hereinafter, a configuration in which a dust prevention performance is further improved relative to the configuration according to the third exemplary embodiment will be described with reference to FIGS. 6A and 6B.

A dust prevention configuration in a radial direction (X direction) is similar to the dust prevention configuration in the radial direction (X direction) according to the third exemplary embodiment, and thus will not be described.

Figure 6A:
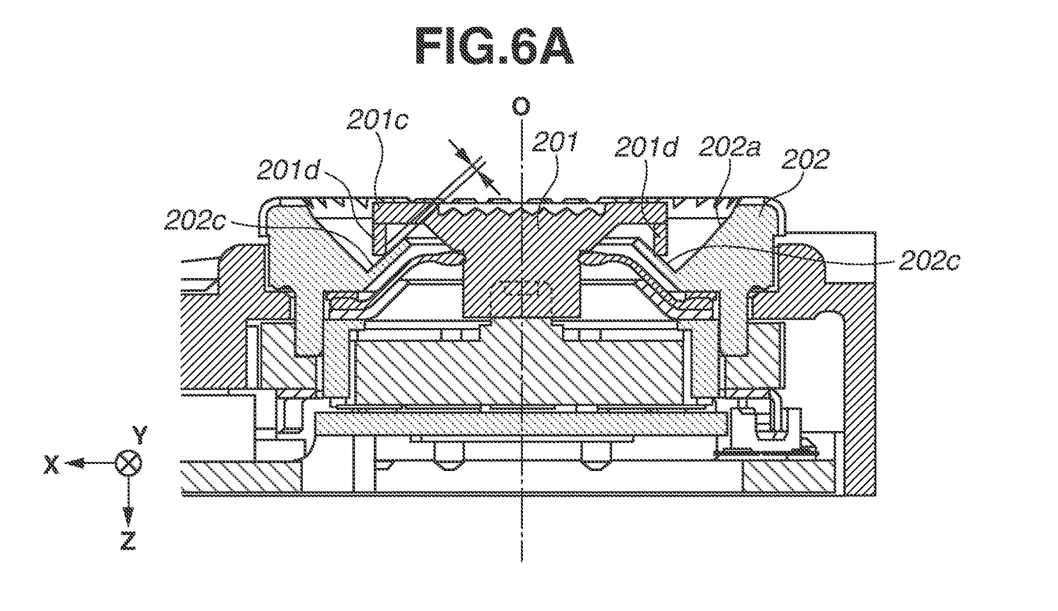
FIG. 6A is a cross-sectional view of an example of an operation component that has a dust prevention configuration (rubber-charged configuration).

FIG. 6A is a cross-sectional view illustrating an example of an operation component that has a dust prevention configuration (rubber-charged configuration).

A rubber portion 201d as an elastic component is formed at an end of the flange 201c of the key top 201.

At this time, the rubber portion 201d is formed in such a manner that a gap in the Z direction between the rubber portion 201d of the key top 201 and a first slope 202a of a rotation dial 202 is small.

Desirably, the small gap is set to a minimum value with which the rotation dial 202 and the key top 201 do not touch each other.

This prevents dirt and dust from being caught from the radial direction (X direction) and prevents operability of the rotation dial 202 from decreasing or operation failure of the rotation dial 202 from occurring.

Since the gap is small, a path along which dirt and dust enter is restricted compared to the configuration described in the third exemplary embodiment. Thus, a higher dust prevention performance can be expected.

The rubber portion 201d may be formed on the flange 201c using two-shot molding. Alternatively, the rubber portion 201d may be stuck to the flange 201c with, for example, a double-sided adhesive tape.

Figure 6B:
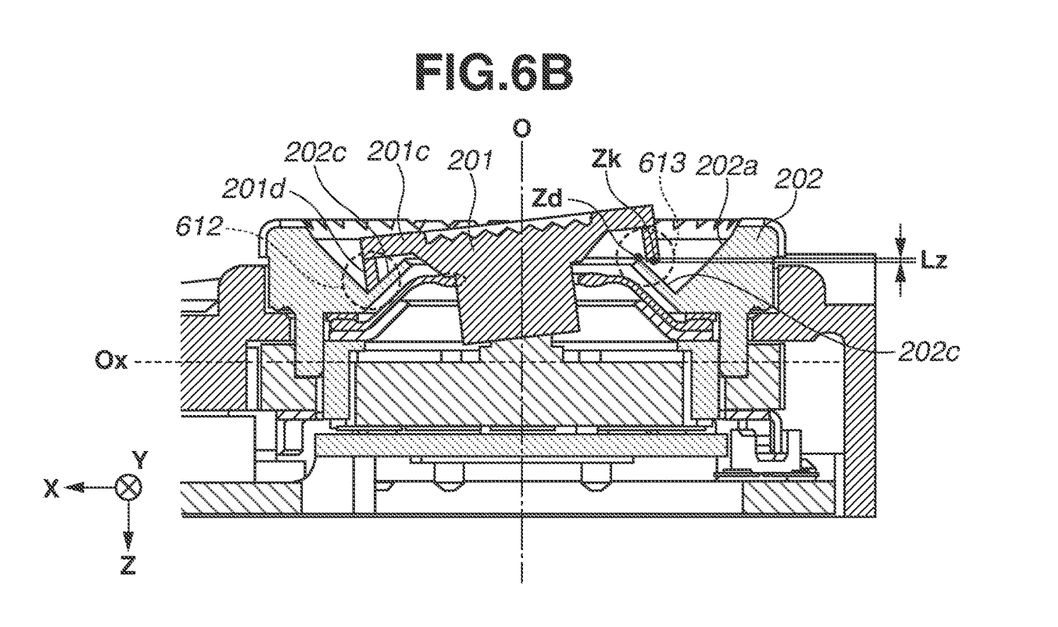
FIG. 6B is a cross-sectional view illustrating a key top in FIG. 6A that is tilted.

FIG. 6B is a cross-sectional view illustrating the key top 201 in FIG. 6A that is tilted.

Since the key top 201 includes the rubber portion 201d, in a case where a user tilts the key top 201, part of the rubber portion 201d is compressed against the second slope 202c in the Z direction as illustrated in a detailed portion 612. Thus, an airtight structure is formed, whereby it is possible to prevent dirt and dust from being caught.

At this time, since the rubber portion 201d is an elastic component, the rotation dial 202 is not scratched even if the second slope 202c and the rubber portion 201d are in a compression state.

On the other hand, the rubber portion 201d is formed in such a manner that, at a portion 613 that is not compressed and has a gap, the upper end Zd of the second slope 202c partially overlaps the lower end Zk of the rubber portion 201d of the key top 201 also in the Z direction (overlap amount Lz).

Consequently, it is possible to prevent dirt and dust from being caught from the radial direction (X direction) can be prevented.

With the above configuration, even when a user tilts the key top 201, the rotation dial 202 is not scratched. Further, it is possible to prevent dirt and dust from being caught from the radial direction (X direction), and to prevent operability of the rotation dial 202 from decreasing or operation failure of the rotation dial 202 from occurring.

The configuration includes the elastic component (rubber portion) 201d. In a case where the tilt operation component 201 is seen in the direction orthogonal to the rotation axis of the rotation operation component 202, the elastic component 201d extends toward the rotation detection units 208 from an outer edge of the tilt operation plane 201b of the tilt operation component 201 in the rotation axis direction.

In the case where the tilt operation component 201 is seen in the direction orthogonal to the rotation axis of the rotation operation component 202, there is a gap between an end of the elastic component 201d that is close to the rotation detection units 208 and the second slope 202c in the rotation axis direction in a state where the tilt operation component 201 is not tilted. The exemplary embodiments of the present disclosure have been described. However, the present disclosure is not limited to the exemplary embodiments. The exemplary embodiments can be variously modified or changed within a range of the gist of the present disclosure.

In the first to fourth exemplary embodiments, the information input device 200 as illustrated in FIG. 2 has been described. In the information input device 200, the tilt operation plane 201b of the tilt operation component 201 is placed within an annular shape of the rotation operation plane 202b of the rotation operation component 202.

The present disclosure is not limited to the configuration in FIG. 2.

As an operation unit placed within the annular shape of the rotation operation plane 202b of the rotation operation component 202, an optical tracking pointer (OPT).

An operation plane on which a finger of a user of the OPT is put may be placed within the annular shape of the rotation operation plane 202b of the rotation operation component 202.

The OPT is an example of optical input devices and is a touch operation component that optically detects motion of a pattern, such as a fingerprint of a finger.

OTPs discussed in Japanese Patent Application Laid-Open No. H11-345076, Japanese Patent No. 4374049, and U.S. Pat. No. 6,552,713 can be used.

The OTP detects touch operation, detects an object (for example, a finger) that relatively moves in a two-dimensional direction, and outputs motion information regarding motion of, for example, a finger.

The OTP includes a light emission unit (not illustrated) and an optical position detection device (not illustrated). The light emission unit emits light to an operation plane of each of an AF-ON button and a shutter button on which a finger is placed from an inside of each of the buttons.

The optical position detection device measures reflected light reflected from a pattern, such as a fingerprint of the finger. The optical position detection device may include, for example, an image sensor.

In the present modification, image processing described in Japanese Patent Application Laid-Open No. H11-345076, for example, may be used to track a motion direction and a motion amount of a finger in images and generate a signal that represents motion of the finger.

A position of a focus detecting point frame displayed on an in-viewfinder field display device and a position of an focus detecting point frame that can be displayed on a display unit can be moved by using output from the OTP that includes motion information about a finger that relatively moves.

A displayed object that can be displayed on the in-viewfinder field display device or the display unit and can be moved is not limited to the focus detecting point frame. For example, an operation that switches from an image that has been played to a next image that will be played may be performed by using the motion information from the OTP.

The motion information from the OTP may also be used, for example, to move a cursor to perform selection on a menu screen, or to switch between setting values of a camera, such as shutter speeds, ISO sensitivities, apertures, and exposure compensation.

Electronic devices according to exemplary embodiments of the present disclosure are not limited to digital cameras that are image capture devices. The electronic devices according to the exemplary embodiments of the present disclosure can also be applied to copy machines, laser beam printers (LBPs), and inkjet printers.

The electronic devices according to the exemplary embodiments of the present disclosure can also be applied to mobile devices that are portable small computers, such as smartphones, tablet computers, and smartwatches.

The electronic devices according to the exemplary embodiments of the present disclosure can also be applied to cars, medical devices, and game consoles.

The tilt operation component according to the exemplary embodiments of the present disclosure may be placed on a handle of a portable X-ray device that is a medical device, and may allow fine adjustment of tilt operation.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of priority from Japanese Patent Application No. 2020-019728, filed Feb. 7, 2020, which is hereby incorporated by reference herein in its entirety.

What is claimed is:

1. An information input device comprising:
a rotation operation component being annular in shape and configured to allow rotation about a rotation axis extending in a direction perpendicular to a rotation operation plane of the rotation operation component;
a tilt operation component configured to tilt in a plurality of directions within a plane orthogonal to the rotation axis of the rotation operation component;
a tilt detection unit configured to detect a tilt operation by the tilt operation component; and
a rotation detection unit configured to detect the rotation of the rotation operation component,
wherein the tilt operation component extends in a rotation axis direction of the rotation operation component,
wherein in a rotation axis direction of the rotation operation component, the rotation operation plane and the tilt operation plane are placed on substantially a same plane,
wherein a tilt operation plane of the tilt operation component is coplanar with the rotation operation plane of the rotation operation component,
wherein, in a case where the rotation operation component is seen in a direction orthogonal to the rotation axis direction of the rotation operation component, the rotation operation component has a first slope that faces the tilt operation component and that is on an inner periphery side of the rotation operation component and is inclined relative to the rotation axis of the rotation operation component,
wherein, in the case where the rotation operation component is seen in the direction orthogonal to the rotation axis direction of the rotation operation component, a distance of the first slope from the rotation axis of the rotation operation component increases as a distance of the first slope from the rotation detection unit increases,
wherein, in the case where the rotation operation component is seen in the direction orthogonal to the rotation axis direction of the rotation operation component,
the rotation operation component is tilted at a maximum tilt angle θ1 within a range in which the movable switch can tilt, and the angle formed by the rotation axis of the rotation operation component and the tilt operation plane is defined as θ2, and
wherein, θ2 is bigger than θ1.

2. An image capture device comprising:
the information input device according to claim 1; and
a control unit configured to perform control corresponding to operation being input into the information input device.

3. An information input device comprising:
a rotation operation component being annular in shape and configured to allow rotation about a rotation axis extending in a direction perpendicular to a rotation operation plane of the rotation operation component;
a tilt operation component configured to tilt in a plurality of directions within a plane orthogonal to the rotation axis of the rotation operation component;
a tilt detection unit configured to detect a tilt operation by the tilt operation component;
a rotation detection unit configured to detect the rotation of the rotation operation component,
a holding component configured to place the rotation detection unit on an inside of the information input device; and
a reflection unit having a reflection plane on which emitted light emitted from the rotation detection unit is reflected,
wherein the tilt operation component extends in a rotation axis direction of the rotation operation component,
wherein a tilt operation plane of the tilt operation component is coplanar with the rotation operation plane of the rotation operation component,
wherein, in a case where the rotation operation component is seen in a direction orthogonal to the rotation axis direction of the rotation operation component, the rotation operation component has a first slope that faces the tilt operation component and that is on an inner periphery side of the rotation operation component and is inclined relative to the rotation axis of the rotation operation component,
wherein, in the case where the rotation operation component is seen in the direction orthogonal to the rotation axis direction of the rotation operation component, a distance of the first slope from the rotation axis of the rotation operation component increases as a distance of the first slope from the rotation detection unit increases,
wherein the rotation detection unit is a reflection-type photosensor,
wherein, in a case where the rotation detection unit is seen in a direction orthogonal to the rotation axis direction of the rotation operation component, the rotation detection unit is placed further inside in a radial direction of the rotation operation component relative to an external form of the tilt detection unit, wherein the rotation detection unit is placed on the holding component in such a manner that a detection direction of the rotation detection unit is orthogonal to the rotation axis direction of the rotation operation component, and wherein the reflection unit is placed in such a manner that the reflection plane of the reflection unit faces the rotation detection unit.

4. An image capture device comprising:

the information input device according to claim 3; and a control unit configured to perform control corresponding to operation being input into the information input device.

5. An information input device comprising:

a rotation operation component being annular in shape and configured to allow rotation about a rotation axis extending in a direction perpendicular to a rotation operation plane of the rotation operation component;

a tilt operation component configured to tilt in a plurality of directions within a plane orthogonal to the rotation axis of the rotation operation component;

a tilt detection unit configured to detect a tilt operation by the tilt operation component; and a rotation detection unit configured to detect the rotation of the rotation operation component, wherein the tilt operation component extends in a rotation axis direction of the rotation operation component, wherein a tilt operation plane of the tilt operation component is coplanar with the rotation operation plane of the rotation operation component, wherein, in a case where the rotation operation component is seen in a direction orthogonal to the rotation axis direction of the rotation operation component, the rotation operation component has a first slope that faces the tilt operation component and that is on an inner periphery side of the rotation operation component and is inclined relative to the rotation axis of the rotation operation component, and wherein, in the case where the rotation operation component is seen in the direction orthogonal to the rotation axis direction of the rotation operation component, a distance of the first slope from the rotation axis of the rotation operation component increases as a distance of the first slope from the rotation detection unit increases, wherein, in a case where the rotation operation component is seen in a direction orthogonal to the rotation axis direction of the rotation operation component, the rotation operation component has a second slope extending from an end of the first slope that is closer to the rotation detection unit than another end of the first slope, and a distance of the second slope from the rotation axis of the rotation operation component decreases as a distance of the second slope from the rotation detection unit increases, wherein, in the case where the rotation operation component is seen in the direction orthogonal to the rotation axis direction of the rotation operation component, a distance of an end of the second slope that is on an inner side and is closer to the tilt operation plane than another end of the second slope, to the rotation axis is less than a distance of an end of an outer edge in a radial direction of the tilt operation component to the rotation axis, and wherein, in the case where the rotation operation component is seen in the direction orthogonal to the rotation axis direction of the rotation operation component, relative to the rotation axis direction, the end of the second slope that is on the inner side and is close to the tilt operation plane is lower than an end of the first slope that is close to the tilt operation plane, is lower than the tilt operation plane of the tilt operation component, and is higher than an end of the tilt operation component that is close to the rotation detection unit.

6. The information input device according to claim 5, wherein, in the case where the rotation operation component is seen in the direction orthogonal to the rotation axis direction of the rotation operation component, the end of the second slope that is on the inner side and is close to the tilt operation plane is positioned closer to the rotation axis than the end of the outer edge in the radial direction of the tilt operation component is in a state where the tilt operation component is tilted.

7. The information input device according to claim 6, further comprising an elastic component that, in a case where the tilt operation component is seen in the direction orthogonal to the rotation axis direction of the rotation operation component, extends toward the rotation detection unit from an outer edge of the tilt operation plane of the tilt operation component in the rotation axis direction, wherein, in the case where the tilt operation component is seen in the direction orthogonal to the rotation axis direction of the rotation operation component, there is a gap in the rotation axis direction between an end of the elastic component that is close to the rotation detection unit and the second slope in a state where the tilt operation component is not tilted.

8. An image capture device comprising:

the information input device according to claim 5; and a control unit configured to perform control corresponding to operation being input into the information input device.

* * * * *